United States Patent Office 3,405,754
Patented Oct. 15, 1968

3,405,754
TIRES CONTAINING ETHYLENE-PROPYL-
ENE-DIENE RUBBER AND PROCESS OF
MANUFACTURE
Louis W. Georges and Ronald L. Denecour, Akron, Ohio,
assignors to The Firestone Tire & Rubber Company,
Akron, Ohio, a corporation of Ohio
Filed Apr. 27, 1964, Ser. No. 362,709
23 Claims. (Cl. 152—330)

ABSTRACT OF THE DISCLOSURE

A novel tire cord dip composition including a phenol and an aldehyde in resin-forming proportions, a latex of terpolymer of ethylene, propylene and a diene is provided. Also provided are composite reinforcing cords for rubber articles comprising a fibrous cord substrate having coated thereon the novel dip composition hereof and rubber articles reinforced therewith such as rubber tires.

---

This invention relates to reinforcing elements for rubber, and compositions useful in preparing such reinforcing elements, and more particularly to fibrous, or cord reinforcing elements which have been coated with an adhesive dip composition hereinafter more particularly described. This invention also relates to an improved method of reinforcing rubber articles, for example rubber tires.

In order to improve the strength, durability, and life of rubber articles, including pneumatic tires, rubber hoses, and other rubber goods, it has become a common expedient to incorporate into the bodies of such articles reinforcing elements, particularly reinforcing fibrous cord materials. For example, tire cords or fabric webbing, formed from cotton, rayon, nylon, (polyester, e.g. "Dacron"), and various other polyester materials, as well as metal wire, have been used for the purpose of reinforcement of the side walls of such articles. It has been found that changes in the composition of the rubber stock from which such articles are fabricated, as well as changes in the nature of the reinforcing element itself result in a variety of different results in terms of bond strength between the rubber article and the reinforcing element embedded therein. The coaction between a given rubber stock and a given reinforcing fabric or cord presents a different problem of adhesion in each case. For example, the adhesion between synthetic fibrous materials and rubber, whether natural, or synthetic, or a combination of the two is very poor. Accordingly, the art has developed dip compositions for the purpose of applying a coating to the filament, cord, fiber, or fabric which improves the adhesion of the reinforcing element to the rubber stock.

One of the well known dip compositions is that described in Patent No. 2,128,229 to Charch et al. This composition is dependent upon the presence of a polyhydric-phenol aldehyde resin in combination with a rubber material. The dip compositions from which these coatings, and the methods by which these coatings were applied varied widely and included dipping the cord or fabric material in aqueous solution of the resin-forming materials which included a rubber latex. Following the application of the aqueous solution including the rubber latex, the fibers were squeezed or pressed to remove the excess solution, and then dried at a temperature which was sufficient to promote the formation of an infusible, insoluble resinous material by interaction of the phenol material with the aldehyde material.

The present invention provides a new cord dip composition and reinforcing element produced therewith, which element coacts with certain rubber materials in a superior way. Broadly speaking, the improved dip compositions of the present invention are characterized by the inclusion therein of a latex which is formed from an elastomer which includes in polymerized relationship therein, units derived from ethylene and propylene, and more particularly, latices formed from terpolymers of ethylene, propylene, and a diene particularly a non-conjugated diene. The cord materials which may be treated with these compositions to provide greatly improved reinforcing elements for rubber articles include both natural and synthetic fibers as strands, cords, compound cords or woven webbing of the types which will be hereinafter more particularly described. These reinforcing elements have been found to coact especially well with rubber articles formed from polymerized ethylene and propylene, and particularly terpolymers of ethylene, propylene, and a non-conjugated diene, such as dicyclopentadiene, otherwise known as "EPT." These reinforcing elements are particularly useful in tires of a pneumatic type formed from EPT rubbers and from butyl rubbers, as well as mixtures of butyl and EPT rubbers.

The utilization of the composite reinforcing elements of the present invention in the fabrication of a rubber article is illustrated in the annexed drawings which are intended to be only illustrative, and in no way limiting of the present invention, and wherein.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Figure 1:
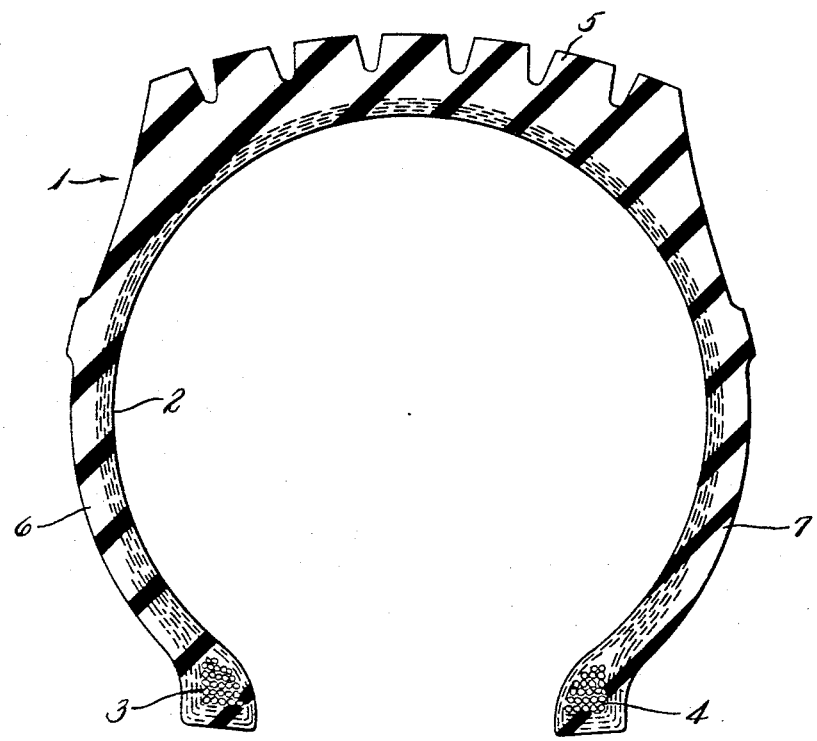
FIG. 1 is a cross-sectional view of a pneumatic tire including plies having embedded therein reinforcing elements in accordance with the present invention.

Referring now more particularly to FIG. 1, there is here shown in cross section a pneumatic tire generally indicated at 1, and composed of a rubberized fabric body portion 2 terminating at its edges in two inextensible bead portions 3 and 4. A rubbery tread 5 is superimposed and bonded as by vulcanization to cord reinforced portion 2. Rubbery side walls 6 and 7 extended from respective edges of the tread along the fabric body portion 2 to which they are bonded, respectively, to the bead portions 3 and 4.

Figure 2:
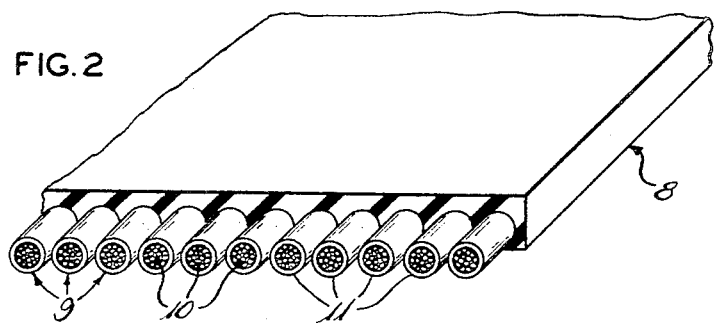
FIG. 2 is an enlarged, fragmentary perspective view in section, and somewhat diagrammatic, showing a portion of a ply including in oriented fashion, reinforcing elements of the present invention having the coating derived from the improved dip compositions hereof thereon.

FIG. 2 is a fragmentary, partially diagrammatic cross-sectional view in perspective showing a ply from which the body portion 2 is formed, and generally indicated at 8. Ply 8 is conveniently formed by extruding the desired rubber stock material through a die in surrounding relationship with reinforcing elements 9 simultaneously drawn through the die orifice. Reinforcing elements 9 as shown in FIG. 2 are composed of cords 10 of a formation such as those known as 840/2/3. This symbol indicates a cord formed from three strands of nylon twisted together, each strand composed of two yarns of 840 denier twisted together. For use in reinforcing conventional pneumatic passenger tires, a cord having a denier of 5040 is preferred, but the ply denier may range from 3360 to 7560. Surrounding each of the cords 10, and diagrammatically illustrated, is a coating 11 which coating is formed on the cords 10 by dipping in the novel dip compositions of the present invention followed by removal of excess dip composition, and drying of the cord by conventional means under such conditions of temperature as will promote the formation of an infusible, insoluble resin from the reactive resin forming constituents included in the dip composition hereof. It will be understood, of course, that the cords 10 are completely saturated with the dip composition and that the resin-elastomer coating penetrates and becomes mechanically locked and adhered to the cord forming strands.

In fabricating pneumatic rubber tires in accordance with this invention, conventional procedures and apparatus are used.

As indicated above, the rubber stock reinforcing elements of the present invention include a synthetic fibrous material or a naturally occurring fibrous material. These materials may be present in the form of single strands, a plurality of strands twisted together, or strands formed from a plurality of fibers in generally oriented condition and twisted with one or more other strands to form a cord. Also, these reinforcing elements may include a plurality of cords which in turn have been twisted together to form a composite cord material such as that which is shown in FIG. 3 of U.S. Patent No. 2,991,818. Among the naturally occurring fibers which may be used in forming the reinforcing elements of the present invention are cotton, hemp, wool, animal hair, silk, etc. Glass, asbestos, nylon, poly(ethylene terephthalate), steel wire, cellulose acetate, rayon, etc. are examples of the synthetic fibers which may be used. Mixtures of natural and synthetic fibers, or mixtures of natural fibers and mixtures of synthetic fibers may also be used. The foregoing fibrous materials are used to form or provide strands, threads, yarns, cords, or composite cords such as previously described which serve as substrates to receive and support the coatings formed during drying from the adhesive dip compositions of the present invention.

As broadly indicated above, the adhesive dip compositions of the present invention include an infusible, insoluble, resinous material, and a latex of an elastomeric terpolymer of ethylene, propylene, and a diene, particularly a non-conjugated diene, such as dicyclopentadiene.

The resinous materials are preferably those which are formed from polyhydric phenolic compounds and aldehydes which are both water soluble to the extent of from one-half per cent to five percent by weight. These resins are capable of forming a substantially insoluble, infusible material by condensation polymerization, or setting up, at a rapid rate and to a sufficient extent, with or without the presence of an added catalyst or condensing agent, at temperatures above about 100° C. preferably at temperatures of 125° C. to 175° C. In applying these resinous materials to the fibrous substrates, the reactant materials may either be dissolved in the aqueous medium in sufficient concentration, respectively, to form the desired resinous component in the dip compositions during the processing of the dipped substrates, or the resinous component may be present in the form of a partially polymerized resinous material which is still in the water soluble stage. The latter represents the initial condensation product of a phenol and an aldehyde, and is commonly called an A-stage resin, or resol. Such A-stage resins are generally soluble in the alkaline medium existing in the dip composition. Phenolic compounds which are particularly satisfactory for use as components of the insoluble, infusible resin material include the polyhydric phenols, and particularly the polyhydric phenols having hydroxyl groups in the benzene nucleus meta with respect to each other, such as resorcinol, phloroglucinol, and orcinol. The amount of phenolic compound in the solution or dispersion is preferably between 0.5% and 5% by weight.

The coreactive material for forming the resinous components of the coatings of the present invention is commonly formaldehyde. This material is conveniently used in the form of an aqueous solution containing about 37% of formaldehyde and commonly known as Formalin. Any other aldehyde which has sufficient water solubility and reactivity to form under the conditions, an insoluble, infusible resinous component may be used. Such suitable aldehydes are acetaldehyde, furfuraldehyde, chloral, acrolein and the like. The amount of aldehyde used is preferably somewhat in excess of that theoretically required per mole of phenol in order to insure condensation of all of the phenol present. For example a ratio of 1.2 moles of formaldehyde to 1 mole of phenol.

The aqueous dip composition is also preferably on the basic side, i.e. having a pH in excess of 7.5, and generally in the range of from about 8.0 to 9.0. The alkaline condition is obtained by use of an alkali metal hydroxide, such as sodium hydroxide, or potassium hydroxide.

The second essential ingredient of the dip compositions of the present invention is, as indicated above, a material which will coact in the dip composition to provide in the coating on the fibrous substrate an elastomeric terpolymer of ethylene, propylene, and a diene.

Latices of these materials are not generally known. However, the terpolymers of ethylene, propylene, and a variety of diene materials are known. Specific examples of the third or diene monomer present in the formation of the terpolymers include: 6-methyl-1, 5-heptadiene; 1,4-hexadiene; 11, ethyl-1; 11-tridecadiene; 2-methylene-5-norbornene; 2-methyl norbornadiene; 2-(2'-ethyl-2'-butenyl) - norbornene; dicyclopentadiene; dicyclooctadiene. These diene materials, which are preferably non-conjugated, are copolymerized with ethylene and propylene to form a terpolymer, the amounts of such diene materials varying in accordance with the desired final properties of the terpolymer. Ordinarily, ethylene and propylene are the predominating materials and may be present in weight ratios in the range of from 70:30 to 30:70, respectively. The amount of the diene component generally provides unsaturation to the extent of from 0.5% to about 5%-C=C-unsaturation. A typical example of a latex useful in accordance with the present invention is produced as follows:

The present invention will be illustrated by the following example using an ethylene-propylene-dicyclopentadiene terpolymer, for example a 67:33:5.3 ratio of monomers on a weight basis, otherwise known as EPT:

500 grams of ethylene/propylene/dicyclopentadiene terpolymer (EPT) were dissolved in 10.1 pounds of commercial hexane to give a total of 4590 grams of "rubber cement." 50 grams of poly(ethoxylated)nonyl phenol (8–10 ethoxy groups), 250 grams of 20% aqueous solution of sodium salts of sulphate monoesters of mixed lauryl and myristyl alcohols, 250 grams of 20% potassium oleate aqueous solution were dissolved in 5000 grams of water. This material had added to it in an Eppenbach machine the "rubber cement," and the two formed into an emulsion. Agitation in the Eppenbach machine was continued for a period of 30 minutes following the termination of the addition of the "rubber cement" to the aqueous emulsifier solution. Thereafter, the emulsion was submitted to solvent removal in a disc type evaporator, and the volume was held at 3 gallons with water while the solvent was removed by evaporation at an ambient temperature surrounding the exposed portion of the disc in excess of the boiling point of the solvent. 9,950 grams of desolvated latex were recovered which contained 500 grams of rubber. To this 945 grams of a creaming agent consisting of 10% ammonium alginate in water solution were added together with an additional 300 grams of water. The separation yielded 10,020 grams of skim, or serum, and 1130 grams of cream. On concentration, there were obtained 935 grams of concentrated latex having a total solids of 45.4%, equivalent to 425 grams of dry rubber. This amounted to 85% recovery.

In the course of this example, the aqueous solution was chilled in a sink with ice water and then the cement emulsified in an Eppenbach machine by pouring slowly into the chilled aqueous solution. The solution was kept cool for several hours the whole remaining at about 13° C. During this period, the highly volatile fraction was removed and there was little subsequent foaming when transferred to the concentrator.

The foregoing latex may be used in accordance with the following formulation to produce a suitable adhesive dip composition in accordance with the present invention. Instead of the specific EPT material described in the foregoing example any other EPT material, for example those produced in accordance with the teachings of Patent No. 2,975,159, may be used in producing these adhesive dip compositions. The procedure for forming the latex is substantially the same as that described above.

It becomes convenient at this point to illustrate the novel compositions of the present invention as well as variations thereof which result in improved adhesive dip compositions. These examples are to be understood as exemplary only of the invention and not limiting of the invention to the precise scope thereof.

EXAMPLE I

This example utilizes an EPT latex produced in accordance with the procedure outlined above and having a pH of 8.40 and a total solids content of 43.2%.

8.6 grams of commercial grade resorcinol, 13.7 grams of Formalin (37% aqueous solution of HCHO) were dissolved in 160 grams of water, and 1.3 grams of a 50% solution of sodium hydroxide added. This composition was then added to 140 grams of the aforesaid EPT latex with thorough stirring.

The resulting composition may be used for the treatment of fabrics, for example the backing of carpet materials to provide a non-skid surface with the webbing thereof, for the adhesive dip treatment of tire cord, etc. Drying of these materials to produce reinforcing elements may be done at oven temperatures, or air temperatures above 100° C., such as 125° C. to 175° C.; and more preferably at temperatures of 150° C. to 160° C.

EXAMPLE II

A particularly useful dip composition for tire cord is produced in accordance with the following formulation:

| | Grams |
|---|---|
| EPT latex | 140 |
| Resorcinol (commercial grade) | 8.6 |
| Formaldehyde | 5.1 |
| Sodium hydroxide | 0.6 |
| Reinforcing carbon black | 3.5 |
| Zinc oxide | 2.0 |
| Water | 245 |

In producing the adhesive dip composition the carbon black is dispersed in water to produce a commercially available carbon black dispersion. In like manner, the zinc oxide is also dispersed in water to the extent of about 50% by weight to produce a commercially available zinc oxide dispersion. Sodium hydroxide is also dissolved in water to produce a 50% aqueous solution.

The resorcinol and formaldehyde are dissolved in about ⅔ of the water and the sodium hydroxide solution added with stirring. The resin forming composition is then added to the latex also with good mixing. The carbon black dispersion which is normally available at about 35% concentration as a reinforcing carbon black dispersion is diluted with half of the remaining water and added to the latex-resin reactant composition. The zinc oxide dispersion is diluted with the balance of the water and added to the mixture. The resulting composition has a pH of about 8.35. This material may be used directly as an adhesive dip composition for tire cord material such as nylon, polyester, cotton, rayon, steel wire, etc. to produce reinforcing elements for rubber articles, particularly pneumatic rubber tires.

EXAMPLE III

The following ingredients were mixed in accordance with the following proportions and directions to produce an adhesive cord dip for rayon cord. An ethylene-propylene terpolymer, in which the third monomer was 2-methylene norbornene was used as the latex base. This latex was produced in accordance with the procedure given above for producing ethylene-propylene terpolymer latices, and this particular latex had a total solids content of 43.0% and a pH of 8.25.

68.8 parts of resorcinol and 109.6 parts of Formalin were dissolved in 1600 parts of water, and 10.4 parts of a 50% aqueous solution of sodium hydroxide added. The resulting aqueous solution was then dispersed in the ethylene-propylene terpolymer latex, the latter being in the amount of 1120 parts. 80 parts of a 35% reinforcing carbon black aqueous dispersion were then added in admixture with 80 parts of water. 32 parts of a 50% zinc oxide dispersion were further diluted with 80 parts of water and added to the composition. The total amount of water in the composition was 1760 parts. Initially, this composition had a pH of 8.3 which dropped to about 7.9 after standing for three days. Additional 10% sodium hydroxide was added to raise the pH to 8.2.

This material was used as a dip composition for rayon tire cord in the conventional manner for treating such cord to produce a pneumatic rubber tire reinforcing element. The resultant reinforcing element was provided with a coating including as film forming constituents, a polyhydric phenol-aldehyde resin and an ethylene-propylene-2-methylene norbornene terpolymer elastomer in admixture therewith.

EXAMPLE IV

The procedure of Example III is duplicated with the exception that instead of 5 grams of formaldehyde there are used 15 grams of furfural. The resulting product is useful as an adhesive dip composition for rayon and nylon tire cord materials.

EXAMPLE V

The foregoing Example IV is duplicated replacing the 68.8 parts of resorcinol with 100 parts of phloroglucinol. In all other respects, the adhesive dip composition is the same.

This material is useful as an adhesive dip composition for tire cord material such as nylon, polyester rayon, etc. This composition was also useful for polyester tire cord materials, which are formed from a poly(ethylene terephthalate) composition.

In the foregoing composition, the ratio of the polyhydric phenol-aldehyde resin to the elastomeric terpolymer is about 1:4. In general, this ratio may vary from about 1:8 to 1:2, although for best results, a ratio intermediate the extremities of this range is preferred, e.g. 1:4.

Once the reinforcing elements of the present invention have been formed, they may be embedded in rubber articles in the usual manner for incorporating such reinforcing elements, for example by means of extrusion concurrently with the rubber stock material which is to be reinforced thereby. These procedures are well known and need not be discussed in detail herein. It should be noted, however, that the synthetic fabric rubber reinforcing elements of the present invention do demonstrate a unique coaction with rubber articles formed from butyl rubber, ethylene-propylene rubber, ethylene-propyleneterpolymer elastomers (EPT rubbers), and rubber articles formed from mixtures of EPT rubber and butyl rubber.

In order to show the remarkable improvement and coaction between reinforcing elements which have been treated with adhesive dip compositions in accordance with the present invention and embodied in butyl rubber, EPT rubber, and combinations of butyl rubber and EPT rubber, the standard H-adhesion pull test has been used.

All tests specimens are prepared in the same way. The rubber test specimens are cured for a period of about 20 minutes at a temperature of about 300° F. at a pressure of 200 lbs. per square inch. Adhesion values are given in pounds as measured by pulling a rayon cord out of a block of rubber .25" wide by 0.1" thick and about 1" long. This test is more fully described in U.S. Patent No. 3,111,448. Under ideal conditions, untreated viscose rayon and nylon cord may be bonded to both natural and synthetic rubber by a cold adhesive force of not more than 7 lbs. to 9 lbs. pull and usually much less. By treating these cord materials with natural rubber latex, values of 12 lbs. pull for both natural and synthetic rubber may be obtained using a nylon fiber. With viscose rayon, the value is increased to about 15 for natural rubber and to 17 for synthetic rubber. Utilizing one of the improvements of the prior art in which the latex is a 1,3-butadiene-2-vinyl pyridine copolymer (U.S. Patent No. Reissue 23,451) the bond strength increases with nylon by 37% on natural rubber and by 100% on synthetic rubber. This means that the readings are about 17 lbs. and 24 lbs., respectively.

The following tables tabulate some of the surprising results which have been secured by utilizing reinforcing elements produced in accordance with the present invention in rubber articles formed from butyl rubber and rubber articles formed from EPT rubber, and rubber articles formed from mixtures of the two.

This composition is produced in the same manner as Example II omitting, however, the zinc oxide ingredient.

EXAMPLE XX

| | Parts |
|---|---|
| EPT latex | 140 |
| Resorcinol (commercial grade) | 8.6 |
| Formaldehyde | 5.1 |
| Sodium hydroxide | 0.6 |
| Water | 250.5 |

The foregoing composition is formulated and produced in the same manner as Example II above.

In curing the dipped cords prior to embedding in the rubber stock, the temperature is usually below about 230° C., and preferably between 150° C. and 160° C. for a period of 3–5 minutes. The reinforced rubber stock is cured at a time and temperature approximating those of actual tire building conditions, e.g. from 30 to 75 minutes at 290° F. to 340° F. with the usual conditions being 50 minutes at 310° F.

In the foregoing table the adhesive dip compositions are formulated substantially in accordance with the formulation given in Example II above, changes being made in the type of latex material which is used. The stock material is also varied in accordance with the information given in the table. The effect of variations in the curing of the stock material has also been noted in several cases, the

TABLE I

| Example No. | Adhesive dip rubber latex | Stock material | Cure time (hrs.) | Temp., (° F.) | Specific adhesion (lb./in.) 75° F. | Specific adhesion (lb./in.) 230° F. |
|---|---|---|---|---|---|---|
| 6 | EPT (1) | EPT (1) | 40 | 310 | 43 | 26 |
| 7 | EPT (1)-Butyl (1:1) | EPT (1) | 40 | 310 | 42 | 21 |
| 8 | EPT (1)-Butyl (1:3) | EPT (1) | 40 | 310 | 42 | 21 |
| 9 | EPT (1) | Butyl | 40 | 310 | 60 | 34 |
| 10 | EPT (1) | EPT (1) | 50 | 310 | 96 | 39 |
| 11 | EPT (1) | EPT (1) | 70 | 320 | 66 | 31 |
| 12 | EPT (2) | EPT (2) | 25 | 300 | 50 | 18 |
| 13 | EPT (3) | Butyl | 40 | 310 | 80 | 52 |
| 14 | EPT (2) | do | 50 | 310 | 108 | 50 |
| 15 | EPT (2) | EPT (2)-Butyl (1:1) | 50 | 310 | 72 | 45 |
| 16 | EPT (2) | do | 50 | 310 | 85 | 51 |
| 17 | EPT (4) | Butyl | 50 | 310 | 58 | [1] 31 |
| 18 | EPT (4) | do | 50 | 310 | 75 | [1] 45 |

[1] Without ZnO.

TABLE II.—COMPARATIVE PULL STRENGTHS
[Rayon cord standard pull test]

| Latex added to resorcinol-formaldehyde, dip | Rubber stock | Specific adhesion (lb./in.) 75° F. | Specific adhesion (lb./in.) 230° F. |
|---|---|---|---|
| No dip | Natural | 0 | 0 |
| None | do | 0 | 0 |
| Vinyl pyridine [1] | do | 100+ | 80 |
| Do | EPT | 20 | 5 |
| Do | Butyl | 15 | 0 |
| Do | SBR [2]/Nat. (4:1) | 70 | 35 |
| Butyl | Butyl | 48 | 31 |
| Do | Natural | 0 | 0 |
| Do | EPT | 40 | 20 |
| EPT | Natural | 20 | 5 |
| EPT | EPT | 90 | 40 |
| EPT | Butyl | 100 | 50 |
| EPT | EPT/Butyl (1:1) | 85 | 51 |

[1] See U.S. Patent No. Re. 23,451.
[2] Styrene-butadiene rubber.

The following examples show suitable compositions for making dip baths omitting the zinc oxide and both the zinc oxide and the reinforcing carbon black. These compositions may be used with reinforcing element materials, e.g. polyester fibers, which do not stretch extensively as does nylon, for example.

EXAMPLE XIX

| | Parts |
|---|---|
| EPT latex | 140 |
| Resorcinol (commercial grade) | 8.6 |
| Formaldehyde | 5.1 |
| Sodium hydroxide | 0.6 |
| Reinforcing carbon black | 3.5 |
| Water | 247 | conditions of such cure being specified. The data for the adhesion derived via the pull test above indicated, have been determined at 75° F. and at 230° F.

The foregoing table shows quite clearly the unique coaction that exists between the rubber reinforcing elements including as the latex material an ethylene-propylene terpolymer material, when the rubber stock material used in forming the rubber article is a butyl rubber, an ethylene-propylene terpolymer rubber, or a mixture of the two, for example a 50:50 mixture.

There has thus been provided, an improved adhesive dip composition which is especially useful in treating cord materials to form improved composite or coated reinforcing elements for inclusion in the body of rubber used in fashioning a rubber article. In the case of rubber articles formed from butyl rubbers, ethylene-propylene terpolymer rubbers, and rubbers formed from a mixture of butyl and EPT rubbers, there is a surprising coaction between the reinforcing elements so produced and the rubber compositions which gives pull strength greatly in excess of those heretofore obtainable, and particularly in the case of synthetic resins which are notorious for their poor adhesion to both natural rubber and synthetic rubber bodies.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A composite reinforcing cord for a rubber article comprising in combination:
   (a) a fibrous cord substrate, and
   (b) as a coating thereon, a film including in intimate association:
      (1) an infusible, insoluble polyhydric phenol-aldehyde resin formed from a reaction mixture including a polyhydric phenol and an aldehyde wherein the aldehyde is in molar excess to the polyhydric phenol, and
      (2) an elastomeric terpolymer of ethylene, propylene and a diene.

2. A composite reinforcing cord in accordance with claim 1 in which the fibrous cord is a synthetic fiber.

3. A composite reinforcing cord in accordance with claim 1 in which the fibrous cord is viscose rayon.

4. A composite reinforcing cord in accordance with claim 2 in which the synthetic fiber is nylon.

5. A composite reinforcing cord in accordance with claim 2 in which the synthetic fiber is poly(ethylene terephthalate).

6. A composite reinforcing cord in accordance with claim 1 in which the polyhydric phenol-aldehyde resin is formed from resorcinol as the polyhydric phenol.

7. A composite reinforcing cord in accordance with claim 6 in which the aldehyde is formaldehyde.

8. A composite reinforcing cord in accordance with claim 1 in which the elastomeric terpolymer is formed from ethylene, propylene and a non-conjugated diene.

9. A composite reinforcing cord in accordance with claim 8 in which the non-conjugated diene is dicyclopentadiene.

10. A composite reinforcing cord for a rubber article comprising in combination:
    (a) a fibrous nylon cord substrate, and
    (b) as a coating thereon, a film including in intimate association:
       (1) an infusible, insoluble resorcinol-formaldehyde resin formed from a reaction mixture including resorcinol and formaldehyde wherein the formaldehyde is in molar excess to the resorcinol, and
       (2) an elastomeric terpolymer of ethylene, propylene and dicyclo-pentadiene, the ethylene and propylene being in a ratio to each other of 1:3 to 3:1 and the dicyclo-pentadiene amounting to from .4% to 6% by weight of the terpolymer,
    the weight ratio of the resorcinol-formaldehyde resin to the terpolymer being about 1:4.

11. A rubber article including in intimately adhered reinforcing relation therewith a composite reinforcing cord, which cord comprises in combination:
    (a) a fibrous cord substrate, and
    (b) as a coating thereon, a film including in intimate association:
       (1) an infusible, insoluble polyhydric phenol-aldehyde resin formed from a reaction mixture including a polyhydric phenol and an aldehyde wherein the aldehyde is in molar excess to the polyhydric phenol, and
       (2) an elastomeric terpolymer of ethylene, propylene and a diene.

12. A rubber article in accordance with claim 11 in which the rubber article is formed from a composition including butyl rubber.

13. A rubber article in accordance with claim 11 in which the rubber article is formed from a composition including an elastomer of copolymerized ethylene and propylene.

14. A rubber article in accordance with claim 11 in which the rubber article is formed from a composition including a mixture of butyl rubber and an elastomeric terpolymer of ethylene, propylene and dicyclopentadiene.

15. A rubber tire formed from a butyl rubber composition including in intimately adhered reinforcing relation therewith a composite reinforcing cord, which cord comprises in combination:
    (a) a fibrous tire cord substrate, and
    (b) as a dip coating thereon, a film including in intimate association:
       (1) an infusible, insoluble resorcinol-formaldehyde resin formed from a reaction mixture including resorcinol and formaldehyde wherein the formaldehyde is in molar excess to the resorcinol, and
       (2) an elastomeric terpolymer of ethylene, propylene and a nonconjugated diene,
    the weight ratio of the resorcinol-formaldehyde resin to the terpolymer being about 1:4.

16. A rubber tire in accordance with claim 15 in which the butyl rubber composition includes an elastomeric terpolymer of ethylene, propylene and a nonconjugated diene.

17. A rubber tire formed from an elastomeric terpolymer of ethylene, propylene and a nonconjugated diene, including in intimately adhered reinforcing relation therewith a composite reinforcing cord, which cord comprises in combination:
    (a) a fibrous tire cord substrate, and
    (b) as a dip coating thereon, a film including in intimate association:
       (1) an infusible, insoluble resorcinol-formaldehyde resin formed from a reaction mixture including resorcinol and formaldehyde wherein the formaldehyde is in molar excess to the resorcinol, and
       (2) an elastomeric terpolymer of ethylene, propylene and a nonconjugated diene,
    the weight ratio of the resorcinol-formaldehyde resin to the terpolymer being about 1:4.

18. A cord dip composition comprising in combination:
    (a) an aqueous alkaline solution of a polyhydric phenol and a water soluble aldehyde in infusible, insoluble resin forming proportions and wherein the aldehyde is in molar excess to the polyhydric phenol,
    (b) an aqueous latex dispersion of an elastomeric terpolymer of ethylene, propylene and a diene, the amount of terpolymer solids in said composition being from 1 to 10 times the amount of resin forming reactant solids.

19. A cord dip composition comprising in combination:
    (a) an aqueous alkaline solution of a polyhydric phenol and a water soluble aldehyde in infusible, insoluble resin forming proportions and wherein the aldehyde is in molar excess to the polyhydric phenol,
    (b) an aqueous latex dispersion of an elastomeric terpolymer of ethylene, propylene and a diene, the amount of terpolymer solids in said composition being from 1 to 10 times the amount of resin forming reactant solids,
    (c) from about 0.1% by weight to about 1.0% by weight of a rubber activator, and
    (d) from about 0.5% by weight to about 1.0% by weight of a rubber reinforcing agent.

20. A cord dip composition comprising in combination:
    (a) an aqueous alkaline solution of a polyhydric phenol and a water soluble aldehyde in infusible, insoluble resin forming proportions and wherein the aldehyde is in molar excess to the polyhydric phenol,
    (b) an aqueous latex dispersion of an elastomeric terpolymer of ethylene, propylene and a diene, the amount of terpolymer solids in said composition being from 1 to 10 times the amount of resin forming reactant solids, (c) an aqueous dispersion of zinc oxide as an activator providing from about 0.1% to about 1.0% of zinc oxide in said dip composition, and (d) an aqueous dispersion of carbon black as a reinforcing agent providing from about 0.5% to about 2% carbon black in said dip composition.

21. A cord dip composition comprising in combination the following ingredients in approximately the amounts indicated:

| | Parts by weight |
|---|---|
| (a) Resorcinol | 5–10 |
| (b) Formaldehyde | 3–7 |
| (c) Alkali metal hydroxide | 4–1 |
| (d) Carbon black | 2–6 |
| (e) Zinc oxide | 1–3 |
| (f) Water | 325 |
| (g) Elastomeric terpolymer | 50–100 | said elastomeric terpolymer being dispersed as a latex, and being a terpolymer of ethylene, propylene and a non-conjugated diene.

22. A cord dip composition having the following composition:

(a) 140 parts by weight of a 40% to 65% solids latex of an elastomeric terpolymer of ethylene, propylene and a non-conjugated diene;

(b) 8.6 parts by weight of resorcinol;

(c) 13.7 parts by weight of Formalin;

(d) 1.3 parts by weight of 50% aqueous sodium hydroxide;

(e) 10 parts by weight of a dispersion of rubber reinforcing carbon black in water, 35% soldis;

(f) 4 parts by weight of a dispersion of zinc oxide activator in water, 50% solids; and (g) 227.7 parts by weight of water, said composition having a pH between about 8.0 and 8.4.

23. In the process of reinforcing a rubber article with a reinforcing cord, the improvement which comprises the steps of:

(a) dipping said cord into a cord dip composition which comprises:

(1) an aqueous alkaline solution of a polyhydric phenol and a water soluble aldehyde in infusible, insoluble resin forming proportions and wherein the aldehyde is in molar excess to the polyhydric phenol, (2) an aqueous latex dispersion of an elastomeric terpolymer of ethylene, propylene and a diene, the amount of terpolymer solids in said composition being from 1 to 10 times the amount of resin forming reactant solids, and (b) drying said dipped cord in an oven at a temperature sufficient to convert said polyhydric phenol and said aldehyde to an infusible, insoluble resin.

References Cited

UNITED STATES PATENTS

| | | | |
|---|---|---|---|
| 3,000,866 | 9/1961 | Tarney | 260—80.5 |
| 3,091,560 | 5/1963 | Miller et al. | 156—110 |
| 3,262,482 | 7/1966 | Clifton et al. | 152—330 |
| 3,125,462 | 3/1964 | Rachinsky | 117—139.5 |
| 3,194,294 | 7/1965 | Van Gils | 161—241 X |
| 3,242,118 | 3/1966 | St. Clair | 156—110 |

EARL M. BERGERT, *Primary Examiner.*

CLIFTON B. COSBY, *Assistant Examiner.*